US012424370B2

(12) United States Patent
Honda et al.

(10) Patent No.: US 12,424,370 B2

(45) Date of Patent: Sep. 23, 2025

(54) COIL COMPONENT

(71) Applicant: Murata Manufacturing Co., Ltd., Kyoto-fu (JP)

(72) Inventors: Hiroyuki Honda, Nagaokakyo (JP); Ryota Hashimoto, Nagaokakyo (JP); Kaori Takezawa, Nagaokakyo (JP)

(73) Assignee: Murata Manufacturing Co., Ltd., Kyoto-fu (JP)

(*) Notice: Subject to any disclaimer, the term of this patent is extended or adjusted under 35 U.S.C. 154(b) by 1011 days.

(21) Appl. No.: 17/504,192

(22) Filed: Oct. 18, 2021

(65) Prior Publication Data

US 2022/0130582 A1 Apr. 28, 2022

(30) Foreign Application Priority Data

Oct. 22, 2020 (JP) ............................ JP2020-177500

(51) Int. Cl.
*H01F 27/28* (2006.01)
*H01F 17/04* (2006.01)
*H01F 17/00* (2006.01)

(52) U.S. Cl.
CPC ....... *H01F 17/045* (2013.01); *H01F 27/2823* (2013.01); *H01F 17/0013* (2013.01); *H01F 2017/0093* (2013.01)

(58) Field of Classification Search
CPC ............... H01F 17/045; H01F 27/2823; H01F 17/0013; H01F 2017/0093; H01F 41/07; H01F 27/006; H01F 27/28; H01F 17/04; H01F 27/34
USPC .......................................... 336/222, 221, 83
See application file for complete search history.

(56) References Cited

U.S. PATENT DOCUMENTS

| | | | | |
|---|---|---|---|---|
| 2013/0154788 A1* | 6/2013 | Morimoto | H01Q 1/273 | 336/221 |
| 2014/0097928 A1* | 4/2014 | Tomonari | H01F 17/045 | 336/207 |
| 2014/0167903 A1* | 6/2014 | Tomonari | H01F 17/045 | 336/220 |
| 2016/0118184 A1* | 4/2016 | Ukai | H01F 17/045 | 336/192 |
| 2017/0294264 A1* | 10/2017 | Hashimoto | H01F 27/29 | |
| 2018/0182528 A1* | 6/2018 | Miyamoto | H01F 27/292 | |

(Continued)

FOREIGN PATENT DOCUMENTS

JP 2017-188568 A 10/2017

*Primary Examiner* — Shawki S Ismail
*Assistant Examiner* — Kazi S Hossain
(74) *Attorney, Agent, or Firm* — Studebaker Brackett PLLC

(57) ABSTRACT

A coil component includes a core that includes a winding core portion and a coil that is wound around the winding core portion and that includes a plurality of wires. The coil includes a stranded wire portion that is formed by twisting the plurality of wires together. The stranded wire portion forms a bank region including a first layer that is formed by continuously winding the stranded wire portion around the winding core portion in a plurality of turns and a second layer that is continuous with the first layer and that is formed by winding the stranded wire portion around the first layer in a plurality of turns. The second layer has at least one pair of adjacent turns, and at least one pair of adjacent turns among all the pairs of adjacent turns are isolated from each other.

17 Claims, 7 Drawing Sheets

(56) References Cited

U.S. PATENT DOCUMENTS

| | | | | |
|---|---|---|---|---|
| 2018/0211763 | A1* | 7/2018 | Komaya | H01F 27/2828 |
| 2018/0211764 | A1* | 7/2018 | Komaya | H01F 17/04 |
| 2019/0131061 | A1* | 5/2019 | Miyamoto | H01F 27/006 |
| 2019/0228901 | A1* | 7/2019 | Asai | H03H 1/00 |
| 2019/0229697 | A1* | 7/2019 | Asai | H01F 27/2823 |

* cited by examiner

COIL COMPONENT

CROSS-REFERENCE TO RELATED APPLICATION

This application claims benefit of priority to Japanese Patent Application No. 2020-177500, filed Oct. 22, 2020, the entire content of which is incorporated herein by reference.

BACKGROUND

Technical Field

The present disclosure relates to a coil component.

Background Art

The coil component described in Japanese Unexamined Patent Application Publication No. 2017-188568 is an example of a coil component of the related art. The coil component includes a core that includes a winding core portion and a coil that is wound around the winding core portion and that includes a plurality of wires. The coil includes a stranded wire portion that is formed by twisting the plurality of wires together, and the stranded wire portion has a first layer that is continuously wound around the winding core portion in a plurality of turns and a second layer that is continuous with the first layer and that is wound around the first layer in a plurality of turns.

In the coil component of the related art, all the adjoining turns in the second layer are in contact with each other. In addition, each turn is formed of the stranded wire portion, and in the stranded wire portion, bulging is likely to occur between the two twisted wires. Thus, adjoining turns interfere with each other, and there has been a problem in that a phenomenon called "misaligned winding" in which the turns of the second layer are not arranged at predetermined positions on the first layer occurs.

SUMMARY

Accordingly, the present disclosure provides a coil component capable of reducing the probability of the occurrence of misaligned winding.

A coil component according to preferred embodiments of the present disclosure includes a core that includes a winding core portion, a coil that is wound around the winding core portion and that includes a plurality of wires. The coil includes a stranded wire portion that is formed by twisting the plurality of wires together. The stranded wire portion forms a bank region including a first layer that is formed by continuously winding the stranded wire portion around the winding core portion in a plurality of turns and a second layer that is continuous with the first layer and that is formed by winding the stranded wire portion around the first layer in a plurality of turns. The second layer has at least one pair of adjacent turns. At least one pair of adjacent turns among all the pairs of adjacent turns are isolated from each other.

Here, the bank region is a region in which the stranded wire portion is wound in a staggered arrangement such that the second layer is stacked on the first layer. In the case where the second layer is formed of, for example, three turns that are the (P−1)th turn, the Pth turn, and the (P+1)th turn (P is a natural number), the adjacent turns refer to the pair of the (P−1)th turn and the Pth turn and the pair of the Pth turn and the (P+1)th turn. In other words, in this case, there are two pairs of adjacent turns.

According to the coil component of the present disclosure, since the at least one pair of adjacent turns are isolated from each other, the probability of the occurrence of misaligned winding can be reduced. In addition, since the at least one pair of adjacent turns are isolated from each other, the stray capacitance between the turns is reduced, and the mode conversion characteristics can be improved.

In the coil component according to the preferred embodiments, the winding core portion has a first end and a second end in an axial direction. The stranded wire portion forming the first layer is wound in a direction from the first end toward the second end, and the stranded wire portion forming the second layer is wound in a direction from the second end toward the first end.

According to the preferred embodiments, the second layer is not formed on a drawing-back line connecting the first layer and the second layer to each other, and thus, the probability of the occurrence of misaligned winding can be more effectively reduced. In addition, the stray capacitance between the first turn of the second layer and the first layer can be reduced.

In the coil component according to the preferred embodiments, when the last turn of the first layer is the Nth turn (N is a natural number and is five or greater), the first turn of the second layer is positioned on the (N−k)th turn (k is a natural number satisfying $1 \leq k \leq N-4$) and the (N−k−1)th turn.

According to the preferred embodiments, the first turn of the second layer is located at a position spaced apart from the last turn of the first layer, and thus, even if the first turn of the second layer is wound in such a manner as to be offset from a desired position toward the side on which the last turn of the first layer is present, the probability that the first turn of the second layer will slip down onto the winding core portion can be reduced.

In the coil component according to the preferred embodiments, the first turn of the second layer is positioned on the Tth turn (T is a natural number and is four or greater) that is the last turn of the first layer and the (T−1)th turn.

According to the preferred embodiments, the turn ordinal number of the last turn of the first layer becomes closer to the turn ordinal number of the first turn of the second layer, and thus, the stray capacitance can be further reduced.

In the coil component according to the preferred embodiments, the winding core portion has a first end and a second end in an axial direction. The stranded wire portion forming the first layer is wound in a direction from the first end toward the second end. The stranded wire portion forming the second layer is wound in the direction from the first end toward the second end.

According to the preferred embodiments, a drawing-forward line extended from the last turn of the second layer does not extend on the second layer, and thus, the probability of occurrence of winding irregularities due to the drawing-forward line pressing the second layer can be reduced.

In the coil component according to the preferred embodiments, the last turn of the stranded wire portion is wound around the winding core portion.

According to the preferred embodiments, compared with the case where the drawing-forward line extended from the last turn of the second layer is directly wired to an electrode, loosening of the last turn of the stranded wire portion can be suppressed.

In the coil component according to the preferred embodiments, the last turn of the stranded wire portion and another turn that is continuous with the last turn are wound around the winding core portion.

According to the preferred embodiments, the probability of the occurrence of loosening in the vicinity of the last turn of the stranded wire portion can be more effectively reduced.

In the coil component according to the preferred embodiments, a plurality of the bank regions are arranged along the axial direction of the winding core portion.

According to the preferred embodiments, the stray capacitance between the first layer and the second layer can be further reduced.

In the coil component according to the preferred embodiments, all the pairs of adjacent turns are isolated from one another.

According to the preferred embodiments, the probability of the occurrence of misaligned winding can be more effectively reduced. In addition, the stray capacitance is further reduced, and the mode conversion characteristics can be further improved.

According to the coil component, which is an aspect of the present disclosure, the probability of the occurrence of misaligned winding can be reduced.

Other features, elements, characteristics and advantages of the present disclosure will become more apparent from the following detailed description of preferred embodiments of the present disclosure with reference to the attached drawings.

DETAILED DESCRIPTION

Figure 1:
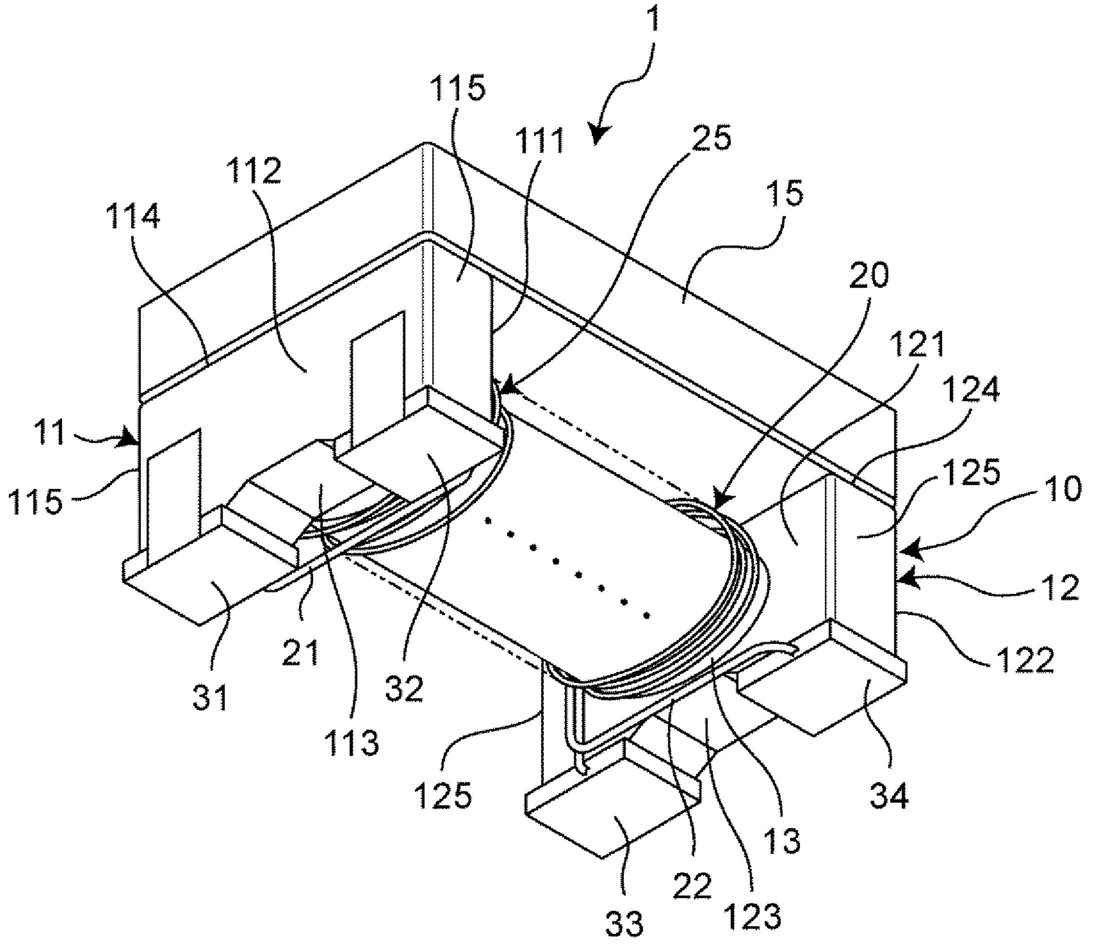
FIG. 1 is a simplified perspective view illustrating a coil component according to a first embodiment when viewed from a lower surface side.

An aspect of the present disclosure will be described in detail below by using the embodiments illustrated in the drawings.

First Embodiment

FIG. 1 is a simplified perspective view illustrating a coil component according to the first embodiment when viewed from a lower surface side. As illustrated in FIG. 1, a coil component 1 includes a core 10, a coil 20 that is wound around the core 10, a first electrode portion 31, a second electrode portion 32, a third electrode portion 33, a fourth electrode portion 34, and a plate member 15 that is attached to the core 10. The first electrode portion 31, the second electrode portion 32, the third electrode portion 33, the fourth electrode portion 34 are disposed on the core 10 so as to serve as external terminals and are electrically connected to the coil 20. Note that, for convenience of description, FIG. 1 illustrates the coil 20 in a simplified manner. Details of the coil 20 will be described later with reference to FIG. 3A and FIG. 3B.

The core 10 includes a winding core portion 13 that has a shape extending in a given direction and around which the coil 20 is wound, a first flange portion 11, and a second flange portion 12. The first flange portion 11 is provided at a first end of the winding core portion 13 in a direction in which the winding core portion 13 extends (an axial direction) and projects in a direction perpendicular to the axial direction, and the second flange portion 12 is provided at a second end of the winding core portion 13 in the direction in which the winding core portion 13 extends (the axial direction) and projects in a direction perpendicular to the axial direction. It is preferable that the core 10 be formed of, for example, a magnetic member such as a ferrite sintered compact or a molded body made of a resin containing magnetic powder, and the core 10 may be formed of a non-magnetic member made of alumina or a resin. The cross-sectional shape of the winding core portion 13 in a direction perpendicular to the direction in which the winding core portion 13 extends may be a substantially quadrangular shape or a different polygonal shape or may be a substantially circular shape, a substantially elliptical shape, or a shape obtained by suitably combining these shapes. Note that, in the following description, the lower surface of the core 10 serves as a mounting surface when the core 10 is mounted onto a mounting substrate, and a surface of the core 10 that is opposite to this lower surface is the upper surface of the core 10.

The first flange portion 11 has an inner surface 111 that faces the winding core portion 13, an outer surface 112 that is oriented in a direction opposite to the direction in which the inner surface 111 is oriented, a lower surface 113 that connects the inner surface 111 and the outer surface 112 to each other, an upper surface 114 that is oriented in a direction opposite to the direction in which the lower surface 113 is oriented, and two side surfaces 115 that connect the inner surface 111 and the outer surface 112 to each other and connect the lower surface 113 and the upper surface 114 to each other. Similarly, the second flange portion 12 has an inner surface 121 that faces the winding core portion 13, an outer surface 122 that is oriented in a direction opposite to the direction in which the inner surface 121 is oriented, a lower surface 123, an upper surface 124, and two side surfaces 125. The lower surface 123 of the second flange portion 12 and the lower surface 113 of the first flange portion 11 are oriented in the same direction. The upper surface 124 of the second flange portion 12 and the upper surface 114 of the first flange portion 11 are oriented in the same direction. The side surface 125 of the second flange portion 12 and the side surface 115 of the first flange portion 11 are oriented in the same direction. Note that, although some of the surfaces are referred to as the lower surfaces and the upper surfaces for explanation purposes, these lower and upper surfaces do not need to be actually located on the lower side or the upper side in the vertical direction.

The plate member 15 is attached to the upper surface 114 of the first flange portion 11 and the upper surface 124 of the second flange portion 12 with an adhesive. For example, the plate member 15 has a length of about 3.2 mm, a width of about 2.5 mm, and a thickness of about 0.7 mm. For example, the plate member 15 is made of the same material as the core 10. In the case where the core 10 and the plate member 15 are both magnetic members, the core 10 and the plate member 15 form a closed magnetic circuit, and the efficiency with which inductance is obtained is improved.

The first flange portion 11 has two legs on the side on which the lower surface 113 is present. The first electrode portion 31 is provided on one of the legs, and the second electrode portion 32 is provided on the other of the legs. The second flange portion 12 has two legs on the side on which the lower surface 123 is present. The third electrode portion 33 is provided on one of the legs, the one leg being located on the same side as the leg on which the first electrode portion 31 is provided, and the fourth electrode portion 34 is provided on the other of the legs, the other leg being located on the same side as the leg on which the second electrode portion 32 is provided. As illustrated in FIG. 1, the lower surface 113 and the lower surface 123 each refer to a portion extending from lower surface portions of the corresponding legs to a lower surface portion of a bridge portion between these legs through inclined surfaces of the bridge portion. At least one of the first electrode portion 31, the second electrode portion 32, the third electrode portion 33, and the fourth electrode portion 34 may have an end surface portion and a bottom surface portion. The end surface portion may be formed on the outer surface 112 of the first flange portion 11 and/or the outer surface 122 of the second flange portion 12 and may include a NiCr layer, a NiCu layer, a Cu layer, a Ni layer, and a Sn layer. The bottom surface portion is formed on the lower surface 113 of the first flange portion 11 and/or the lower surface 123 of the second flange portion 12. The end surface portion and the bottom surface portion may be connected to each other and may include an Ag layer, a Cu layer, a Ni layer and a Sn layer. Note that, in the following description, the first electrode portion 31, the second electrode portion 32, the third electrode portion 33, and the fourth electrode portion 34 may sometimes be collectively called "electrode portions 31 to 34".

The coil 20 includes a first wire 21 and a second wire 22 that are wound around the winding core portion 13. In other words, a direction in which the coil axis of the coil 20 extends matches the axial direction of the winding core portion 13. For example, the first wire 21 and the second wire 22 are each a conductor wire coated with an insulating coating film formed by covering a conductor wire made of a metal such as copper (having a conductor diameter φ of, for example, about 0.020 mm to about 0.080 mm) with a coating film made of a resin such as polyurethane resin, imide-modified polyurethane resin, polyesterimide resin, or apolyamideimide resin. The first wire 21 has a first end that is electrically connected to the first electrode portion 31 and a second end that is electrically connected to the third electrode portion 33. The second wire 22 has a first end that is electrically connected to the second electrode portion 32 and a second end that is electrically connected to the fourth electrode portion 34. The first wire 21 and the second wire 22 are connected to the electrode portions 31 to 34 by, for example, thermocompression bonding, brazing, or welding.

The first wire 21 and the second wire 22 are wound around the winding core portion 13 in the same direction. Accordingly, in the coil component 1, when signals that are 180 degrees out of phase with each other, such as differential signals, are input to the first wire 21 and the second wire 22, the magnetic flux generated by the first wire 21 and the magnetic flux generated by the second wire 22 cancel each other out. As a result, their functions of serving as inductors are weakened and allow the signals to pass therethrough. In contrast, when signals that are in phase with each other, such as exogenous noise, are input to the first wire 21 and the second wire 22, the magnetic flux generated by the first wire 21 and the magnetic flux generated by the second wire 22 reinforce each other. As a result, their functions of serving as inductors are strengthened and do not allow the noise to pass therethrough. Thus, the coil component 1 functions as a common-mode choke coil that attenuates signals in a common mode such as exogenous noise while reducing the passing loss of signals in a differential mode such as differential signals.

When the coil component 1 is mounted onto the mounting substrate, the lower surface of the first flange portion 11 and the lower surface of the second flange portion 12 face the mounting substrate. In this case, a direction in which the winding core portion 13 extends from its first end to its second end is parallel to a direction in which a main surface of the mounting substrate extends. In other words, the coil component 1 is a transversely wound coil component in which the coil axis of the first wire 21 and the coil axis of the second wire 22 are parallel to the mounting substrate.

Figure 2A:
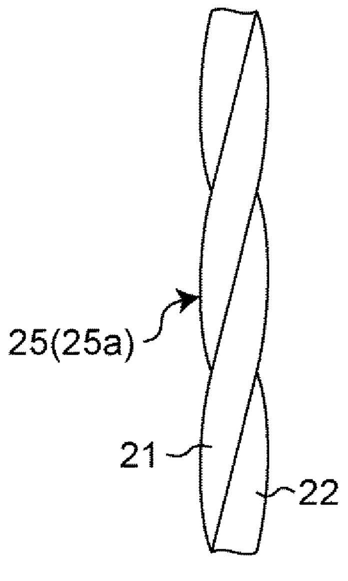
FIG. 2A is an enlarged view of a Z-twisted stranded wire portion.
Figure 2B:
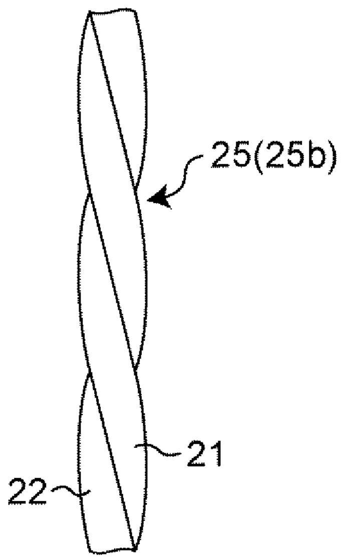
FIG. 2B is an enlarged view of an S-twisted stranded wire portion.

The coil 20 includes a stranded wire portion 25 that is formed by twisting the first wire 21 and the second wire 22 together. FIG. 2A and FIG. 2B are each an enlarged view of the stranded wire portion 25. FIG. 2A illustrates a Z-twisted stranded wire portion 25*a*, and FIG. 2B illustrates an S-twisted stranded wire portion 25*b*. The twisting direction of the Z-twisted stranded wire portion 25*a* and the twisting direction of the S-twisted stranded wire portion 25*b* are opposite to each other. As illustrated in FIG. 2A and FIG. 2B, the stranded wire portion 25 is a portion that is formed by twisting the first wire 21 and the second wire 22 together. In the stranded wire portion 25, relative differences between the two wires (such as their line lengths and unbalanced stray capacitance) are small, and thus, in the coil component 1, a mode conversion output such as output of a differential-mode signal by converting it into a common-mode signal or vice versa is reduced, and the mode conversion characteristics can be improved. Note that, in the stranded wire portion 25 illustrated in FIG. 2A and FIG. 2B, although the first wire 21 and the second wire 22 are twisted together so as to be in close contact with each other, there may be a gap between a portion of the first wire 21 and a portion of the second wire 22, or the first wire 21 and the second wire 22 may be twisted together in such a manner as to be separated from each other on the whole. In the coil component 1, substantially the entire region in which the coil 20 is wound around the winding core portion 13 corresponds to the stranded wire portion 25. Note that, regarding the twisting direction of the stranded wire portion 25, the stranded wire portion 25 may be Z-twisted or may be S-twisted. Alternatively, the stranded wire portion 25 may have both a Z-twisted portion and an S-twisted portion as will be described later.

Figure 3A:
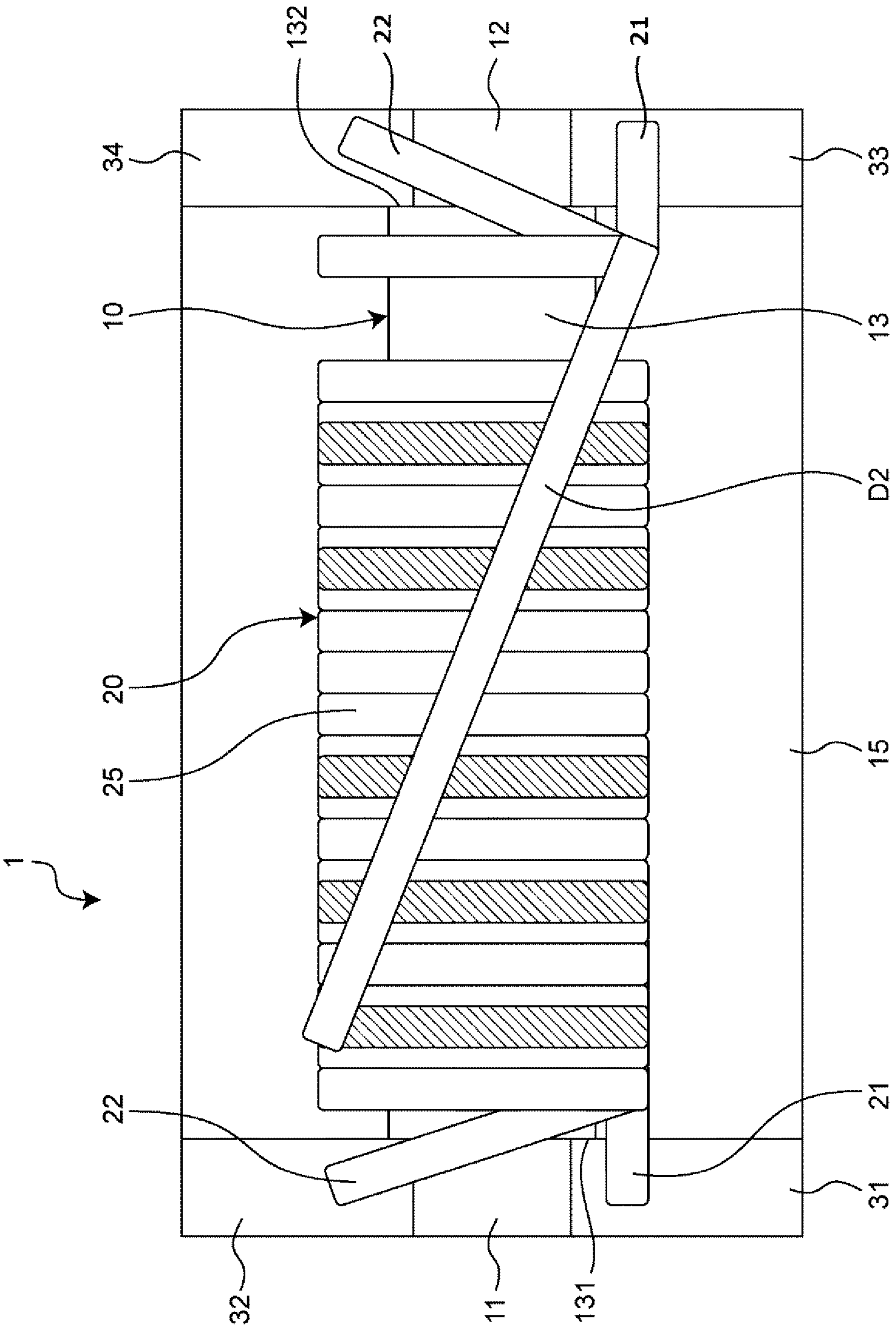
FIG. 3A is a simplified bottom view of the coil component according to the first embodiment.

FIG. 3A is a simplified bottom view of the coil component 1 according to the first embodiment when viewed from the lower surface side. As described above, the coil 20 is wound around the winding core portion 13, and the first end and the second end of the first wire 21 are electrically connected to the first electrode portion 31 and the third electrode portion 33, respectively. The first end and the second end of the second wire 22 are electrically connected to the second electrode portion 32 and the fourth electrode portion 34, respectively. In the region in which the coil 20 is wound around the winding core portion 13, the stranded wire portion 25 is formed by twisting the first wire 21 and the second wire 22 together. Note that FIG. 3A illustrates the stranded wire portion 25 as a single wire for simplification.

In addition, in FIG. 3A, a portion of the stranded wire portion 25 that serves as a second layer, which will be described later, is illustrated by hatching for convenience of description.

Figure 3B:
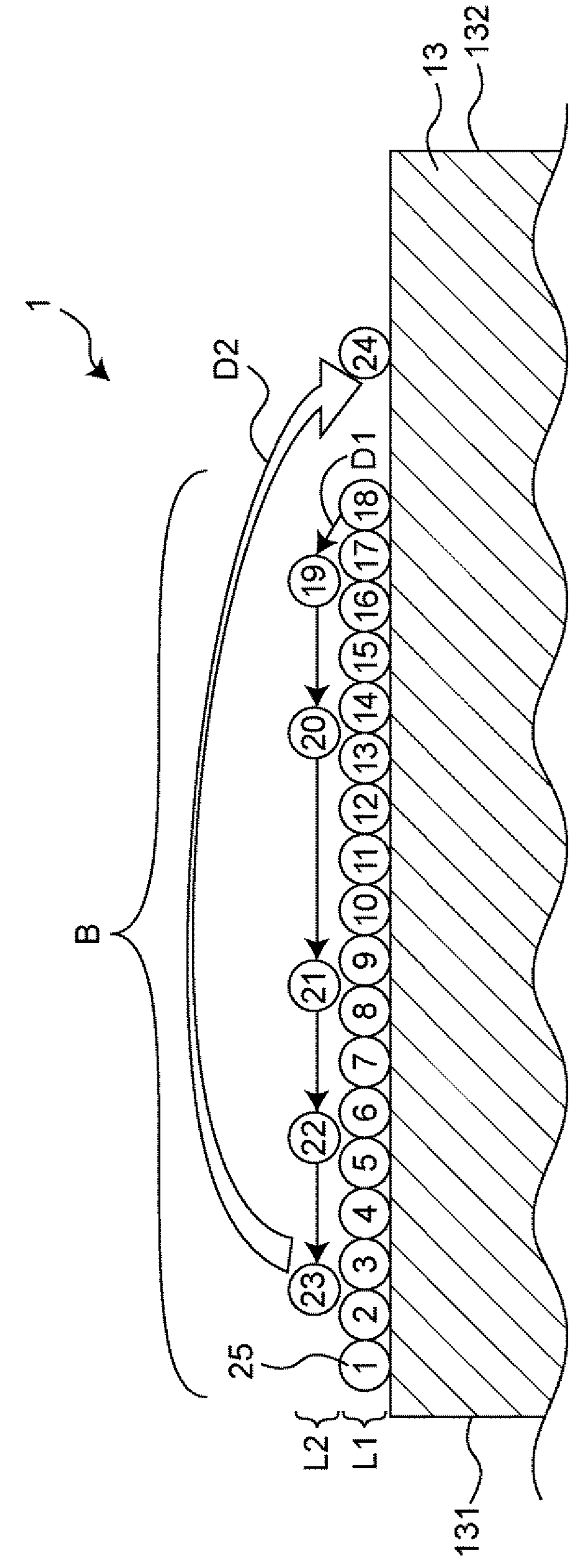
FIG. 3B is a simplified sectional view of the coil component according to the first embodiment.

FIG. 3B is a simplified sectional view of the coil component 1 according to the first embodiment. FIG. 3B is a diagram partially illustrating the cross section including the coil 20 and the winding core portion 13 taken along the axial direction of the winding core portion 13 from a first end 131 of the winding core portion 13 to a second end 132 of the winding core portion 13. In FIG. 3B, the stranded wire portion 25 is illustrated as a single wire for simplification, and its cross section is represented by a simple single circle. In addition, in FIG. 3B, ordinal numbers for turns of the coil 20 (hereinafter referred to as "turn ordinal numbers") counted from the side on which the first end 131 of the winding core portion 13 is present are indicated by numerals. The turn ordinal numbers are not the numbers obtained by sequentially counting the turns starting from the turn closest to the first flange portion 11 and indicate the order in which the turns are formed by winding the coil 20. In the coil component 1, the stranded wire portion 25 is wound in a direction from the first end 131 toward the second end 132 of the winding core portion 13 so as to have a total of 24 turns, which include the 1st turn to the 24th turn.

As illustrated in FIG. 3B, the stranded wire portion 25 of the coil 20 has a bank region B in which a first layer (denoted by a reference sign L1 in FIG. 3B and the subsequent drawings) is formed by continuously winding the coil 20 on the winding core portion 13 in a plurality of turns and in which a second layer (denoted by a reference sign L2 in FIG. 3B and the subsequent drawings) is formed by winding the coil 20 on the first layer in a plurality of turns such that the second layer is continuous with the first layer.

In the bank region B, the first layer is directly wound around the winding core portion 13, and the second layer is directly wound around the first layer. More specifically, in the bank region B, the first layer is formed of 18 turns including the 1st turn to the 18th turn that are continuously wound around the winding core portion 13, and the second layer is formed of the 19th turn that is continuous with the 18th turn of the first layer and that is positioned on the 16th turn and the 17th turn of the first layer, the 20th turn that is positioned on the 13th turn and the 14th turn of the first layer, the 21st turn that is positioned on the 8th turn and the 9th turn of the first layer, the 22nd turn that is positioned on the 5th turn and the 6th turn of the first layer, and the 23rd turn that is positioned on the 2nd turn and the 3rd turn of the first layer.

Here, in the bank region B in the coil component 1, the second layer has at least a pair of adjacent turns. In the case of the coil component 1 illustrated in FIG. 3B, there are a total of four pairs of adjacent turns, which are the first pair of the 19th turn and the 20th turn, the second pair of the 20th turn and the 21st turn, the third pair of the 21st turn and the 22nd turn, and the fourth pair of the 22nd turn and the 23rd turn. In addition, at least one pair of adjacent turns among all the pairs of adjacent turns are isolated from each other. The term "isolate" refers to the case where portions of the wires forming one of adjacent turns are not in contact with portions of the wires forming the other of the adjacent turns over the entire adjacent turns. In the case of the coil component 1 illustrated in FIG. 3B, all the adjacent turns forming the first pair to the fourth pair are isolated from one another. In other words, the first pair of adjacent turns (the 19th turn and the 20th turn) are isolated from each other such that a gap of two turns is formed therebetween. The second pair of adjacent turns (the 20th turn and the 21st turn) are isolated from each other such that a gap of four turns is formed therebetween. The third pair of adjacent turns (the 21st turn and the 22nd turn) are isolated from each other such that a gap of two turns is formed therebetween. The fourth pair of adjacent turns (the 22nd turn and the 23rd turn) are isolated from each other such that a gap of two turns is formed therebetween.

According to the above-described coil component 1, in the second layer, at least one pair of adjacent turns are isolated from each other. As a result, the adjacent turns do not interfere with each other, and thus, the probability of the occurrence of misaligned winding can be reduced. In addition, since at least one pair of adjacent turns are isolated from each other, the stray capacitance between the adjacent turns, which are isolated from each other, is reduced, and the mode conversion characteristics can be improved. In particular, as in the coil component 1 illustrated in FIG. 3B, all the adjacent turns forming the first pair to the fourth pair are isolated from one another in the second layer, so that the probability of the occurrence of misaligned winding can be more effectively reduced. In addition, the stray capacitance is further reduced, and the mode conversion characteristics can be further improved. Furthermore, as illustrated in FIG. 3B, it is preferable that each pair of adjacent turns be isolated from each other such that a gap equal to or larger than a gap of one turn is formed therebetween in order to provide a larger effect of reducing the probability of the occurrence of misaligned winding.

In addition, in the coil component 1, as illustrated in FIG. 3B, the stranded wire portion 25 forming the first layer is wound in the direction from the first end 131 toward the second end 132, the stranded wire portion 25 forming the second layer is wound in the direction from the second end 132 toward the first end 131. As a result, the second layer is not formed on a drawing-back line D1 that connects the first layer and the second layer to each other, and thus, compared with the case where the stranded wire portion 25 forming the second layer is wound in the direction from the first end 131 toward the second end 132, the probability of the occurrence of misaligned winding can be more effectively reduced. In addition, since the second layer is not formed on the drawing-back line D1, the risk of occurrence of a short-circuit between lines due to the drawing-back line D1 being pressed can be reduced. The drawing-back line D1 connects the last turn (the 18th turn) of the first layer and the first turn (the 19th turn) of the second layer to each other and is a stranded wire portion that draws back the first turn to the side on which winding has been started (the side on which the first end 131 is present in the present embodiment) from the side on which the last turn is present. Furthermore, compared with the case where the stranded wire portion 25 forming the second layer is wound in the direction from the first end 131 toward the second end 132, the turn ordinal number of the first turn (the 19th turn) of the second layer is closer to the turn ordinal numbers of the turns (the 16th turn and the 17th turn) of the first layer with which the first turn is in contact, and thus, the stray capacitance between the first turn of the second layer and the first layer can be reduced.

In the coil component 1, when the last turn of the first layer is the Nth turn (N is a natural number and is five or greater), the first turn of the second layer is positioned on the (N−k)th turn (k is a natural number satisfying 1 N−4) and the (N−k−1)th turn. In the case of the coil component 1 illustrated in FIG. 3B, since the last turn of the first layer is the 18th turn, N is 18. In addition, in the case of the coil component 1 illustrated in FIG. 3B, as a natural number satisfying 1 (=14), k is set to 1. In other words, the 19th turn, which is the first turn of the second layer, is positioned on the 17th turn, which is the (N−k)th turn, and the 16th turn, which is the (N−k−1)th turn. As a result, the first turn of the second layer is located at a position spaced apart from the last turn of the first layer, and thus, even if the first turn of the second layer is wound in such a manner as to be offset from a desired position toward the side on which the last turn of the first layer is present, the probability that the first turn of the second layer will slip down onto the winding core portion 13 can be reduced.

Note that the first turn of the second layer may be positioned on the Tth turn (T is a natural number and is four or greater) that is the last turn of the first layer and the (T−1)th turn. Referring to FIG. 3B, the first turn of the second layer (the 19th turn) may be positioned on the 18th turn, which is the last turn of the first layer, and the 17th turn. As a result, the turn ordinal number of the last turn of the first layer becomes closer to the turn ordinal number of the first turn of the second layer, and thus, the stray capacitance can be further reduced.

In the coil component 1, the last turn of the second layer is positioned on the Mth turn (M is a natural number satisfying 2≤M≤N−2) of the first layer and the (M+1)th turn. In the case of the coil component 1 illustrated in FIG. 3B, as a natural number satisfying 2≤M≤N−2 (=16), M is set to 2. In other words, the 23rd turn, which is the last turn of the second layer, is positioned on the 2nd turn, which is the Mth turn, and the 3rd turn, which is the (M+1)th turn. As a result, the last turn of the second layer is located at a position spaced apart from the 1st turn of the first layer, and thus, even if the last turn of the second layer is wound in such a manner as to be offset from a desired position toward the side on which the 1st turn of the first layer is present, the probability that the last turn of the second layer will slip down onto the winding core portion 13 can be reduced. Note that the last turn of the second layer may be positioned on the 1st turn and the 2nd turn of the first layer.

In the coil component 1, the last turn of the stranded wire portion 25 is directly wound around the winding core portion 13. In the case of the coil component 1 illustrated in FIG. 3B, the 24th turn that is the last turn of the stranded wire portion 25 is directly wound around the winding core portion 13. As a result, compared with the case where a drawing line D2 extended from the last turn of the second layer (the 23rd turn) is directly wired to the third electrode portion 33 and the fourth electrode portion 34, loosening of the last turn of the stranded wire portion 25 can be suppressed. The drawing line D2 connects the last turn of the second layer and another turn that is directly wound around the winding core portion 13 to each other and is a stranded wire portion that draws the other turn directly wound around the winding core portion 13 to the side on which the winding is ended (the side on which the second end 132 is present in the present embodiment) from the side on which the last turn is present.

More specifically, in the case where the drawing line D2 extended from the last turn of the second layer (the 23rd turn) is directly wired to the third electrode portion 33 and the fourth electrode portion 34 (i.e., there is no 24th turn), there is a possibility that loosening of the 23rd turn, which is the last turn of the stranded wire portion 25, will occur. In contrast, as in the coil component 1 illustrated in FIG. 3B, the 24th turn, which is the last turn of the stranded wire portion 25, is directly wound around the winding core portion 13, so that loosening of the 24th turn can be suppressed, and loosening of the 23rd turn can also be suppressed.

In addition, as illustrated in FIG. 3B, it is preferable that the last turn of the stranded wire portion 25 (the 24th turn) be positioned so as to be spaced apart from the bank region B. As a result, the last turn of the stranded wire portion 25 and the bank region B do not interfere with each other, and the probability of the occurrence of misaligned winding can be further reduced.

Preferably, the last turn of the stranded wire portion 25 and the turn that is continuous with the last turn may be directly wound around the winding core portion 13. Referring to FIG. 3B, for example, the 24th turn, which is the last turn of the stranded wire portion 25, the 23rd turn, which is the turn continuous with the 24th turn, and the 22nd turn may be directly wound around the winding core portion 13. As a result, the probability of the occurrence of loosening in the vicinity of the last turn of the stranded wire portion 25 can be more effectively reduced.

Second Embodiment

Figure 4:
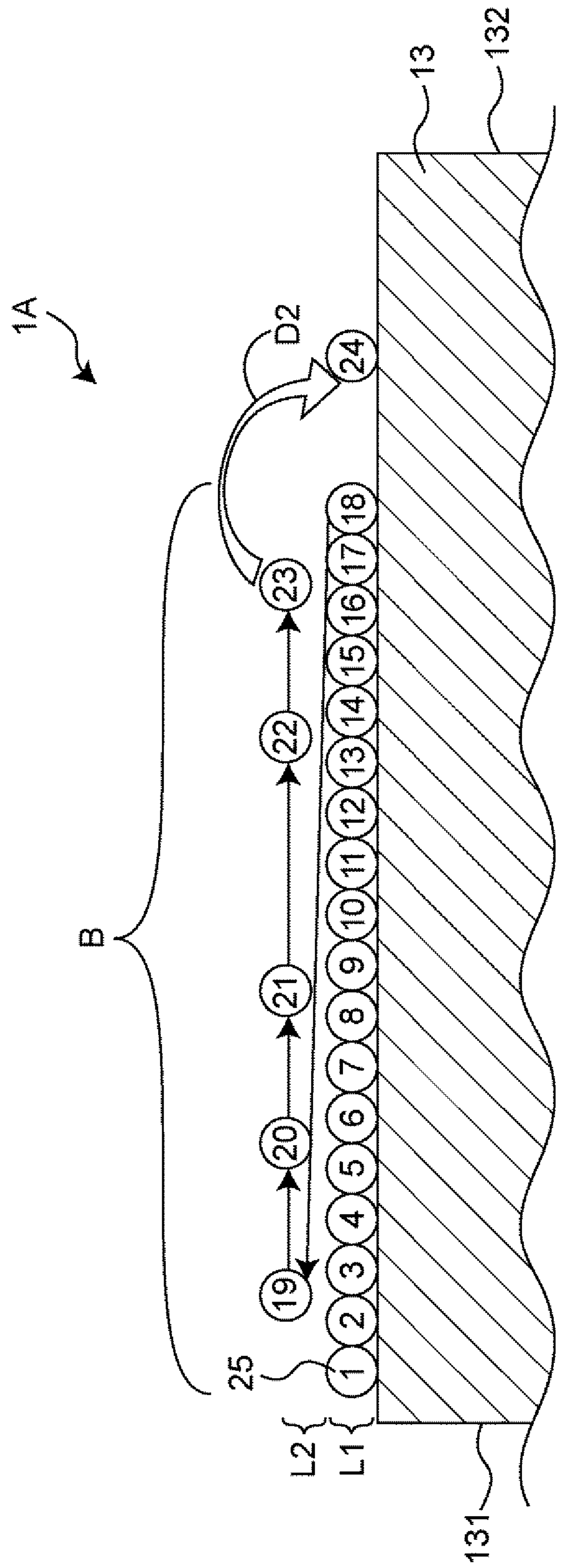
FIG. 4 is a simplified sectional view of a coil component according to a second embodiment.

FIG. 4 is a simplified sectional view illustrating a coil component according to the second embodiment. The difference between the second embodiment and the first embodiment is the order in which the turns are formed in the second layer. This difference will be described below. The rest of the configuration of the coil component of the second embodiment is the same as that of the coil component of the first embodiment. In the following description of the second embodiment, components the same as those in the first embodiment will be denoted by the same reference signs, and descriptions thereof will be omitted.

As illustrated in FIG. 4, in the bank region B of a coil component 1A of the second embodiment, the first layer is formed of 18 turns including the 1st turn to the 18th turn that are continuously wound around the winding core portion 13, and the second layer is formed of the 19th turn that is continuous with the 18th turn of the first layer and that is positioned on the 2nd turn and the 3rd turn of the first layer, the 20th turn that is positioned on the 5th turn and the 6th turn of the first layer, the 21st turn that is positioned on the 8th turn and the 9th turn of the first layer, the 22nd turn that is positioned on the 13th turn and the 14th turn of the first layer, and the 23rd turn that is positioned on the 16th turn and the 17th turn of the first layer. With the above configuration, in the coil component 1A of the second embodiment, the stranded wire portion 25 forming the first layer is wound in the direction from the first end 131 toward the second end 132, and the stranded wire portion 25 forming the second layer is also wound in the direction from the first end 131 toward the second end 132. As a result, the drawing line D2 extended from the last turn of the second layer (the 23rd turn) does not extend on the second layer, and thus, the probability of occurrence of winding irregularities due to the drawing line D2 pressing the second layer can be reduced.

Third Embodiment

Figure 5:
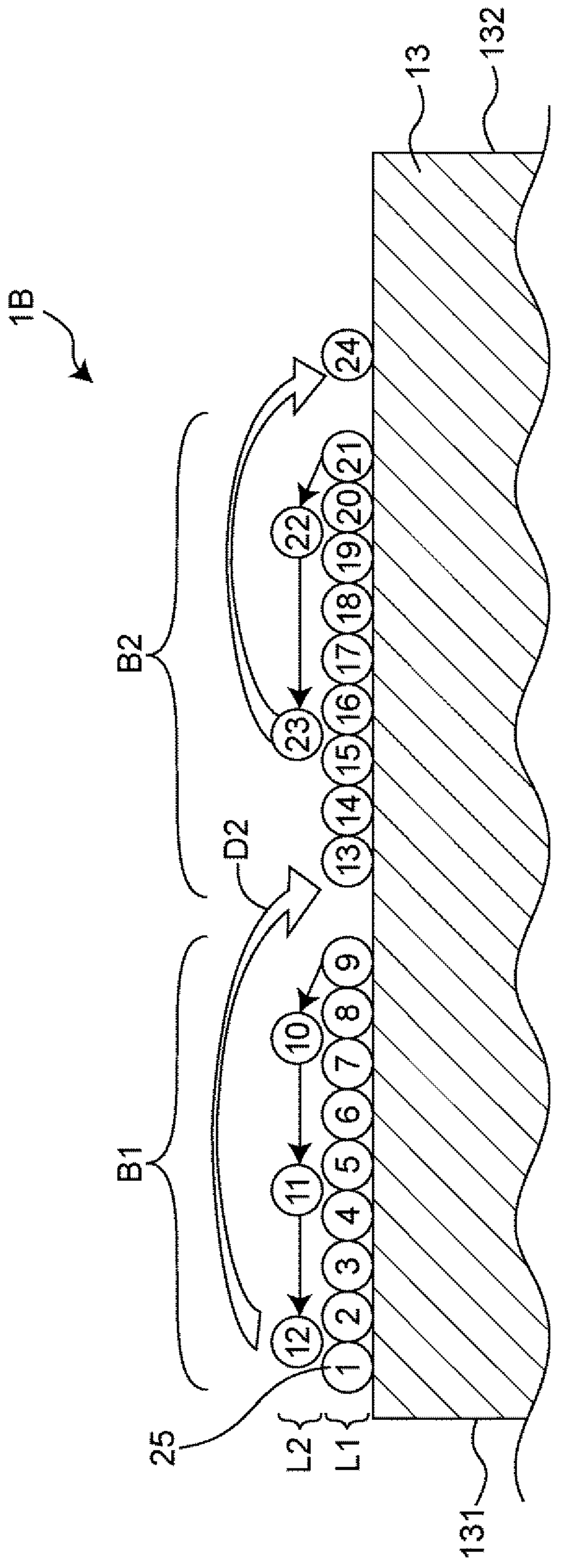
FIG. 5 is a simplified sectional view of a coil component according to a third embodiment.

FIG. 5 is a simplified sectional view illustrating a coil component according to the third embodiment. The difference between the third embodiment and the first embodiment is that the coil component of the third embodiment has a plurality of bank regions. This difference will be described below. The rest of the configuration of the coil component of the third embodiment is the same as that of the coil component of the first embodiment. In the following description of the third embodiment, components the same as those in the first embodiment will be denoted by the same reference signs, and descriptions thereof will be omitted.

As illustrated in FIG. 5, a coil component 1B of the third embodiment has a plurality of bank regions arranged along the axial direction of the winding core portion 13. More specifically, the stranded wire portion 25 of the coil 20 has two bank regions B1 and B2. The first bank region B1 and the second bank region B2 are arranged in this order in the direction from the first end 131 toward the second end 132 of the winding core portion 13, and these adjacent bank regions are isolated from each other. However, the first bank region B1 and the second bank region B2 may be arranged so as to be close to each other without a gap formed therebetween.

The first layer in the first bank region B1 and the first layer in the second bank region B2 are directly wound around the winding core portion 13, and the second layer in the first bank region B1 and the second layer in the second bank region B2 are directly wound around their respective first layers. More specifically, in the first bank region B1, the first layer is formed of nine turns including the 1st turn to the 9th turn that are continuously wound around the winding core portion 13, and the second layer is formed of the 10th turn that is continuous with the 9th turn of the first layer and that is positioned on the 7th turn and the 8th turn of the first layer, the 11th turn that is positioned on the 4th turn and the 5th turn of the first layer, and the 12th turn that is positioned on the 1st turn and the 2nd turn of the first layer. In the second bank region B2, the first layer is formed of nine turns including the 13th turn to the 21st turn that are continuously wound around the winding core portion 13, and the second layer is formed of the 22nd turn that is continuous with the 21st turn of the first layer and that is positioned on the 19th turn and the 20th turn of the first layer and the 23rd turn that is positioned on the 15th turn and the 16th turn of the first layer. The last turn in the first bank region B1 (the 12th turn) and the first turn in the second bank region B2 (the 13th turn) are connected to each other by the drawing line D2. With the above configuration, in the coil component 1B of the third embodiment, the stranded wire portion 25 forming the first layers is wound in the direction from the first end 131 toward the second end 132, and the stranded wire portion 25 forming the second layers is wound in the direction from the second end 132 toward the first end 131. Since the coil component 1B has the plurality of bank regions, compared with the case where the coil component 1B has a single bank region, the turn ordinal numbers of the turns of the first layers are closer to the turn ordinal numbers of the turns of the second layers, and the stray capacitance between the first layers and the second layers can be further reduced.

Fourth Embodiment

Figure 6:
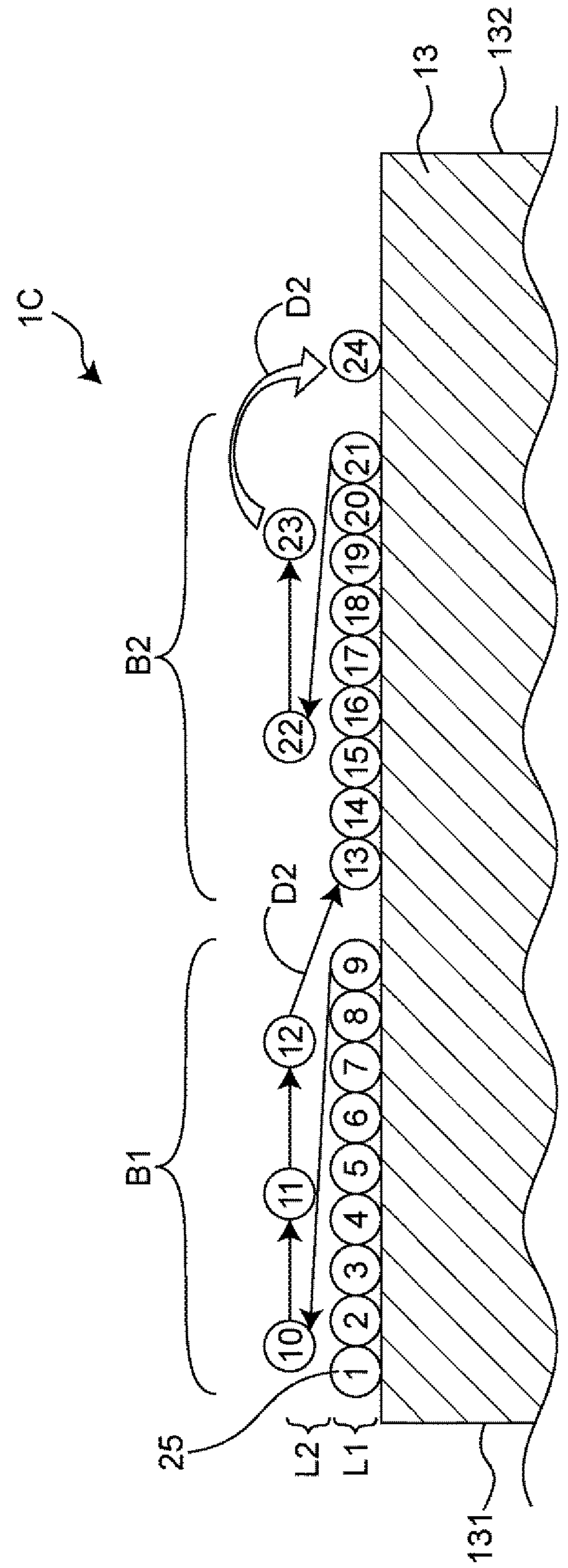
FIG. 6 is a simplified sectional view of a coil component according to a fourth embodiment.

FIG. 6 is a simplified sectional view illustrating a coil component according to the fourth embodiment. A difference between the fourth embodiment and the first embodiment is the order in which the turns are formed in the second layer, and another difference between the fourth embodiment and the first embodiment is that the coil component of the fourth embodiment has a plurality of bank regions. These differences will be described below. The rest of the configuration of the coil component of the fourth embodiment is the same as that of the coil component of the first embodiment. In the following description of the fourth embodiment, components the same as those in the first embodiment will be denoted by the same reference signs, and descriptions thereof will be omitted.

As illustrated in FIG. 6, a coil component 1C of the fourth embodiment has a plurality of bank regions arranged along the axial direction of the winding core portion 13. More specifically, the stranded wire portion 25 of the coil 20 has the two bank regions B1 and B2. The first bank region B1 and the second bank region B2 are arranged in this order in the direction from the first end 131 toward the second end 132 of the winding core portion 13, and these adjacent bank regions are isolated from each other. However, the first bank region B1 and the second bank region B2 may be arranged so as to be close to each other without a gap formed therebetween.

The first layer in the first bank region B1 and the first layer in the second bank region B2 are directly wound around the winding core portion 13, and the second layer in the first bank region B1 and the second layer in the second bank region B2 are directly wound around their respective first layers. More specifically, in the first bank region B1, the first layer is formed of nine turns including the 1st turn to the 9th turn that are continuously wound around the winding core portion 13, and the second layer is formed of the 10th turn that is continuous with the 9th turn of the first layer and that is positioned on the 1st turn and the 2nd turn of the first layer, the 11th turn that is positioned on the 4th turn and the 5th turn of the first layer, and the 12th turn that is positioned on the 7th turn and the 8th turn of the first layer. In the second bank region B2, the first layer is formed of nine turns including the 13th turn to the 21st turn that are continuously wound around the winding core portion 13, and the second layer is formed of the 22nd turn that is continuous with the 21st turn of the first layer and that is positioned on the 15th turn and the 16th turn of the first layer and the 23rd turn that is positioned on the 19th turn and the 20th turn of the first layer. The last turn in the first bank region B1 (the 12th turn) and the first turn in the second bank region B2 (the 13th turn) are connected to each other by the drawing line D2. With the above configuration, in the coil component 1C of the fourth embodiment, the stranded wire portion 25 forming the first layers is wound in the direction from the first end 131 toward the second end 132, and the stranded wire portion 25 forming the second layers is also wound in the direction from the first end 131 toward the second end 132. As a result, the drawing lines D2 extended from the last turns of the second layers (the 12th turn and the 23rd turn) do not extend on their respective second layers, and thus, the probability of occurrence of winding irregularities due to the drawing lines D2 pressing their respective second layers can be reduced. In addition, since the coil component 1C has the plurality of bank regions, compared with the case where the coil component 1C has a single bank region, the turn ordinal numbers of the turns of the first layers are closer to the turn ordinal numbers of the turns of the second layers, and the stray capacitance between the first layers and the second layers can be further reduced.

Note that the present disclosure is not limited to the above-described embodiments, and design changes may be made within the gist of the present disclosure. For example, the features of the first to fourth embodiments may be combined in various ways.

In each of the above-described embodiments, although the coil includes two wires, the coil may include three or more wires as long as the coil includes a plurality of wires. In this case, the stranded wire portion is not limited to having a configuration in which two wires are twisted together and may have a configuration in which three or more wires are twisted together.

The number of turns of the first layer and the number of turns of the second layer may be freely increased or decreased. However, the first layer and the second layer each need to include a plurality of turns. Accordingly, the second layer includes at least a pair of adjacent turns.

In the above-described embodiments, in the second layer, although all the pairs of adjacent turns are isolated from one another, the adjacent turns forming at least one of the pairs may be isolated from each other.

In the above-described embodiments, although the configuration in which the last turn of the stranded wire portion is wound around the winding core portion is employed, a configuration in which the last turn of the stranded wire portion is not wounded around the winding core portion, that is, a configuration in which the wire extended from the last turn of the second layer is directly wired to the third electrode portion 33 and the fourth electrode portion 34 may be employed.

In the third embodiment and the fourth embodiment, although the coil component has the two bank regions, the number of bank regions is not particularly limited, and the coil component may have three or more bank regions. In addition, the order in which the turns of the second layer are formed in one of the bank regions and the order in which the turns of the second layer are formed in the other of the bank regions may be different from each other. For example, in the above-described third embodiment, in both the first bank region B1 and the second bank region B2, the stranded wire portion 25 forming the second layer is wound in the direction from the second end 132 toward the first end 131. However, in the first bank region B1, the stranded wire portion 25 forming the second layer may be wound in the direction from the first end 131 toward the second end 132, and in the second bank region B2, the stranded wire portion 25 forming the second layer may be wound in the direction from the second end 132 toward the first end 131. Alternatively, in the first bank region B1, the stranded wire portion 25 forming the second layer may be wound in the direction from the second end 132 toward the first end 131, and in the second bank region B2, the stranded wire portion 25 forming the second layer may be wound in the direction from the first end 131 toward the second end 132.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A coil component comprising:

a core that includes a winding core portion; and a coil that is wound around the winding core portion and that includes a plurality of wires, wherein the coil includes a stranded wire portion that is configured with the plurality of wires twisted together, the stranded wire portion defines at least one bank region including a first layer that is configured with the stranded wire portion continuously wound around the winding core portion in a plurality of turns and a second layer that is continuous with the first layer and that is configured with the stranded wire portion wound around the first layer in a plurality of turns, the second layer has at least one pair of adjacent turns, and in the second layer, all of the pairs of adjacent turns are isolated from one another.

2. The coil component according to claim 1, wherein the winding core portion has a first end and a second end in an axial direction, the stranded wire portion of the first layer is wound in a direction from the first end toward the second end, and the stranded wire portion of the second layer is wound in a direction from the second end toward the first end.

3. The coil component according to claim 2, wherein when a last turn of the first layer is an Nth turn, where N is a natural number and is five or greater, a first turn of the second layer is positioned on an (N−k)th turn, where k is a natural number satisfying $1 \leq k \leq N-4$, and an (N−k−1)th turn.

4. The coil component according to claim 2, wherein a first turn of the second layer is positioned on a Tth turn, where T is a natural number and is four or greater, that is a last turn of the first layer and a (T−1)th turn.

5. The coil component according to claim 1, wherein the winding core portion has a first end and a second end in an axial direction, the stranded wire portion of the first layer is wound in a direction from the first end toward the second end, and the stranded wire portion of the second layer is wound in the direction from the first end toward the second end.

6. The coil component according to claim 1, wherein a last turn of the stranded wire portion is wound around the winding core portion.

7. The coil component according to claim 1, wherein a last turn of the stranded wire portion and another turn that is continuous with the last turn are wound around the winding core portion.

8. The coil component according to claim 1, wherein a plurality of the bank regions are arranged along the axial direction of the winding core portion.

9. The coil component according to claim 2, wherein a last turn of the stranded wire portion is wound around the winding core portion.

10. The coil component according to claim 3, wherein a last turn of the stranded wire portion is wound around the winding core portion.

11. The coil component according to claim 4, wherein a last turn of the stranded wire portion is wound around the winding core portion.

12. The coil component according to claim 5, wherein a last turn of the stranded wire portion is wound around the winding core portion.

13. The coil component according to claim 2, wherein a last turn of the stranded wire portion and another turn that is continuous with the last turn are wound around the winding core portion.

14. The coil component according to claim 3, wherein a last turn of the stranded wire portion and another turn that is continuous with the last turn are wound around the winding core portion.

15. The coil component according to claim 4, wherein a last turn of the stranded wire portion and another turn that is continuous with the last turn are wound around the winding core portion.

16. The coil component according to claim 2, wherein a plurality of the bank regions are arranged along the axial direction of the winding core portion.

17. The coil component according to claim 3, wherein a plurality of the bank regions are arranged along the axial direction of the winding core portion.

* * * * *